UNITED STATES PATENT OFFICE.

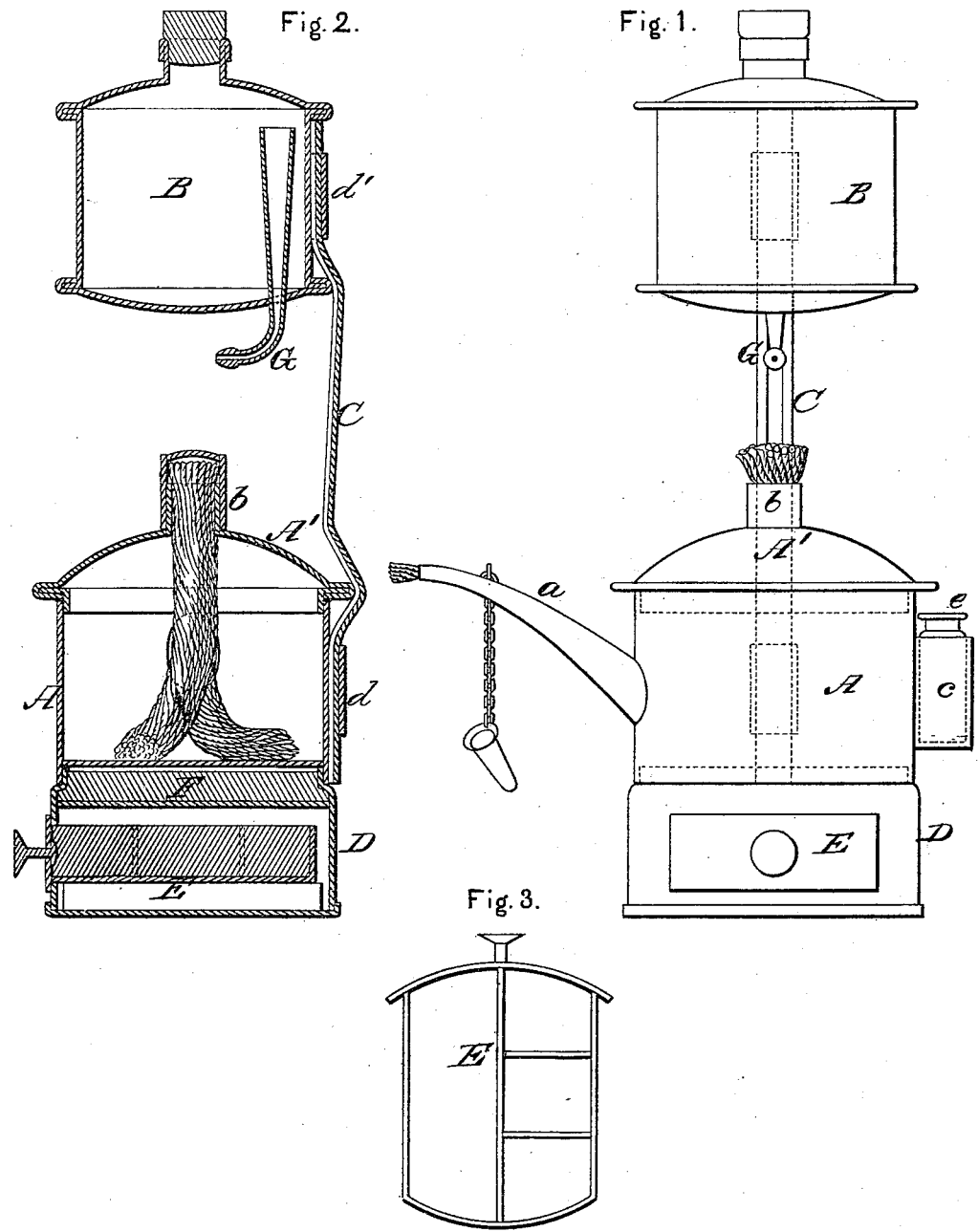

ARTHUR L. HOSMER, OF HOLDEN, MISSOURI, ASSIGNOR OF ONE-HALF HIS RIGHT TO EDWARD P. BARRETT, OF SAME PLACE.

IMPROVEMENT IN JEWELERS' KITS.

Specification forming part of Letters Patent No. 148,704, dated March 17, 1874; application filed February 7, 1874.

*To all whom it may concern:*

Be it known that I, ARTHUR L. HOSMER, of Holden, in the county of Johnson and State of Missouri, have invented a new and valuable Improvement in Jewelers' Kits; and I do hereby declare that the following is a full, clear, and exact description of the construction and operation of the same, reference being had to the annexed drawings making a part of this specification, and to the letters and figures of reference marked thereon.

Figure 1 of the drawing is a representation of a front elevation of my jewelers' kit. Fig. 2 is a sectional view of the same. Fig. 3 is a detail view.

This invention has for its object furnishing a complete set or kit of jewelers' soldering materials, put together in a very convenient and compact form, for use on the table of a jeweler, as will be hereinafter explained.

The following is a description of my invention:

In the annexed drawings, A designates the body of an alcohol-lamp, which is constructed with two burner-tubes, $a\ b$. The tube $a$ springs from the side of the body A, and is made somewhat like the spout or pouring-tube of a common oil-can. This burner is designed for use while soft-soldering. The burner $b$ is in the center of the removable cover A' of the lamp-body A, and is used for heating alcohol in a vessel, B, which is arranged directly over the said burner $b$. By removing the top of the lamp-burner A, I have a very good "alcohol-dish," an article which is frequently used by jewelers for heating their work. On the outer side of the body A a pocket, $c$, and a sheath, $d$, are secured. The pocket is designed for receiving and keeping safely in place an acid bottle, $e$, containing the acid used while soft-soldering. A bottle thus held is very convenient for use, and will not be liable to upset. The sheath $d$ is intended for receiving a movable standard, C, which affords a support for the vessel B over the lamp, and which is attached to this vessel by another movable sheath, $d'$. The lamp-body A is mounted on a box, $d$, and removably secured to it, which box is provided with a drawer, E, containing several apartments for holding soft and hard solder, borax, and other things necessary to prepare for the operation of soldering. The top of this box is a piece of slate, F, which is used to grind the borax for hard-soldering. This slate is accessible by simply removing the box D from the lamp. The vessel B has a stopple in its upper end, and a blow-pipe applied in its lower end. The nozzle of this blow-pipe G is curved, as shown in Figs. 1 and 2, for directing a flame horizontally, and the upper end of this pipe rises nearly to the top of the vessel B, so as to carry off the vapor of alcohol, which vapor is quickly and regularly generated when the burner on top of the lamp is lighted.

I thus have, in my combination, an excellent blow-pipe, which is necessary in the operation of soft-soldering.

I am well aware that an alcohol-vessel furnishing vapor for the blow-pipe, and used in connection with a lamp, has heretofore been used, and, therefore, I do not claim such invention broadly.

What I claim as new, and desire to secure by Letters Patent, is—

1. The lamp A, provided with burners $a\ b$, and a removable cover, A', in combination with the removable vessel B and its blow-pipe G, as and for the purposes set forth.

2. The box D removably applied to the bottom of the lamp, and provided with a drawer, E, and also with a slate-top, F, as and for the purposes set forth.

In testimony that I claim the above I have hereunto subscribed my name in the presence of two witnesses.

ARTHUR L. HOSMER.

Witnesses:
E. P. BARRETT,
B. F. BOWER.